US005626535A

United States Patent [19]
Kono et al.

[11] Patent Number: 5,626,535
[45] Date of Patent: May 6, 1997

[54] AUTOMOBILE CONTROL APPARATUS HAVING FUEL CUTTING MEANS, LOCK-UP CLUTCH CONTROL MEANS AND AUTO-CRUISING MEANS

[75] Inventors: Katsumi Kono, Toyota; Shinya Nakamura, Owariasahi, both of Japan

[73] Assignee: Toyota Jidosha Kabushiki Kaisha, Toyota, Japan

[21] Appl. No.: 533,781

[22] Filed: Sep. 26, 1995

[30] Foreign Application Priority Data

Oct. 12, 1994 [JP] Japan .................................... 6-246134

[51] Int. Cl.$^6$ ............................ F16D 48/00; B60K 41/02
[52] U.S. Cl. ......................... 477/169; 477/174; 180/170
[58] Field of Search ..................... 477/168, 174, 477/166, 169, 180; 180/170, 175, 178

[56] References Cited

U.S. PATENT DOCUMENTS

| | | | |
|---|---|---|---|
| 3,417,836 | 12/1968 | Thorner | 180/170 |
| 4,289,222 | 9/1981 | Esthimer | 477/180 X |
| 4,960,182 | 10/1990 | Mimura et al. | 180/170 X |
| 5,074,392 | 12/1991 | Hasegawa et al. | 477/180 X |
| 5,520,594 | 5/1996 | Fukasawa et al. | 477/166 X |

FOREIGN PATENT DOCUMENTS

| | | | |
|---|---|---|---|
| 63-134832 | 6/1988 | Japan . | |
| 63-255131 | 10/1988 | Japan | 477/174 |
| 2-92743 | 4/1990 | Japan . | |
| 2-129459 | 5/1990 | Japan . | |
| 2-129460 | 5/1990 | Japan | 477/169 |
| 5-149423 | 6/1993 | Japan . | |

OTHER PUBLICATIONS

U.S. application Ser. No. 08/501,341 filed Jul. 12, 1995.
U.S. application Ser. No. 08/503,214, filed Jul. 17, 1995.
U.S. application Ser. No. 08/503,617, filed Jul. 18, 1995.
U.S. application Ser. No. 08/503,744, filed Jul. 18, 1995.
U.S. application Ser. No. 08/503,635, filed Jul. 18, 1995.
U.S. application Ser. No. 08/504,758, filed Jul. 19, 1995.
U.S. application Ser. No. 08/504,078, filed Jul. 19, 1995.
U.S. application Ser. No. 08/539,070, filed Oct. 4, 1995.

*Primary Examiner*—Charles A. Marmor
*Assistant Examiner*—Nathan Jensen
*Attorney, Agent, or Firm*—Oblon, Spivak, McClelland, Maier & Neustadt, P.C.

[57] ABSTRACT

An apparatus for controlling a motor vehicle, including a fuel cutting device for cutting a fuel supply to an engine while a throttle valve is placed in an engine idling position, a clutch control device for effecting partial or full engagement of a lock-up clutch disposed in parallel with a fluid-filled power transmitting device while the throttle valve is placed in the engine idling position, an automatic cruising control device for controlling the throttle valve so that the vehicle runs at a substantially constant speed, and a restricting device for restricting or inhibiting the engagement of the lock-up clutch by the clutch control device while the throttle valve is controlled by the automatic cruising control device. The restricting device may be adapted to restrict or inhibit the engagement of the lock-up clutch if it is determined that the frequency at which the throttle valve is alternately placed in the engine idling position and a position near the engine idling position is higher than a predetermined threshold.

13 Claims, 13 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| D | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | | ○ | | | | ○ | ○ | |
| | (O/D) | × | × | ○ | ○ | | ○ | | | | | | ○ |
| L | 1st | ○ | × | ○ | | | | | ○ | ○ | | ○ | |
| | 2nd | ○ | ○ | ○ | | ○ | ○ | ○ | | | | ○ | |

FIG. 2

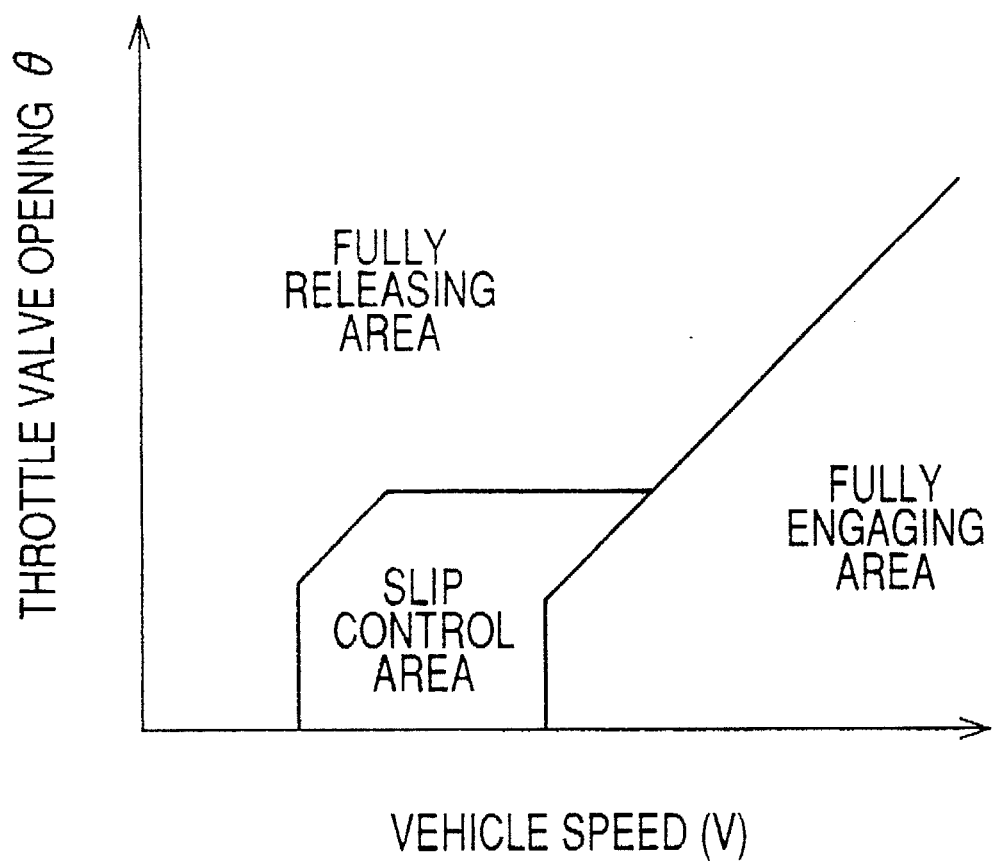

AUTOMOBILE CONTROL APPARATUS HAVING FUEL CUTTING MEANS, LOCK-UP CLUTCH CONTROL MEANS AND AUTO-CRUISING MEANS

BACKGROUND OF THE INVENTION

1. Field of the Invention

The present invention relates in general to an apparatus for controlling a motor vehicle such that a fuel supply to an engine is cut while a lock-up clutch in a power transmitting device is engaged when a throttle valve of the engine is placed in its engine idling position. More particularly, this invention is concerned with a technique for controlling the lock-up clutch while the throttle valve is in an alternate idling and non-idling state as in an automatic cruising mode wherein the amount of opening of the throttle valve is automatically controlled so as to enable the vehicle to run at a substantially constant speed.

2. Discussion of the Related Art

There is known a motor vehicle equipped with (a) fuel cutting means for cutting a fuel supply to an engine when a throttle valve for controlling an intake air quantity of the engine is placed in its engine idling position, and (b) clutch control means for effecting partial or full engagement of a lock-up clutch while the throttle valve is placed in the engine idling position. The lock-up clutch is disposed in parallel with a torque converter, fluid coupling or other fluid-filled power transmitting device adapted to transmit an output of the engine to drive wheels of the vehicle. An example of a motor vehicle control apparatus equipped with such fuel cutting means and clutch control means is disclosed in JP-A-5-149423.

The fuel cutting means is actuated while the throttle valve is almost fully closed or placed in its engine idling position. Usually, the fuel cutting means is activated while the vehicle is in deceleration with the throttle valve placed in the engine idling position, for the purpose of improving the fuel economy of the vehicle and preventing overheating of a catalyst used for the engine. Generally, the fuel cut is initiated when the engine speed is higher than a predetermined fuel-cut threshold, and is terminated when the engine speed falls below a predetermined fuel-supply threshold. On the other hand, the clutch control means is provided to control the lock-up clutch for preventing a rapid drop of the engine speed to thereby increase the time duration of the fuel cut, that is, to increase a range of the vehicle speed within which the fuel cut is continued. Usually, the clutch engagement means is kept in operation until the fuel cutting means is turned off, that is, until the fuel supply is resumed.

Referring to graphs of FIGS. 10A and 10B, there are shown examples of relationships between a speed $N_E$ of the engine, and a speed $N_T$ of a turbine impeller in a power transmission system equipped with a fluid-filled power transmitting device in the form of a torque converter, when the throttle valve is placed in the engine idling position. The graph in FIG. 10A indicates the relationship between the engine speed $N_E$ and the turbine impeller speed $N_T$ when the amount of slip (the degree of partial engagement) of the lock-up clutch is controlled by the clutch control means, while the graph of FIG. 10B indicates the relationship when the lock-up clutch is not controlled by the clutch control means. The fuel cutting means is turned on to initiate the fuel cut of the engine if the throttle valve is in the engine idling position while the engine speed $N_E$ is higher than a predetermined fuel-cut threshold $N_{ON}$. When the engine speed $N_E$ drops below a predetermined fuel-supply threshold $N_{OFF}$ as a result of the fuel cut, the fuel cut is terminated. As is apparent from the graphs, the vehicle speed V when the engine speed $N_E$ has been lowered to the fuel-supply threshold $N_{OFF}$ is lower in the case of FIG. 10A in which the lock-up clutch is controlled, than in the case of FIG. 10B. Accordingly, the fuel cut is effected over a wider range of the vehicle speed V when the lock-up clutch is controlled in the slip control mode, than when the lock-up clutch is not controlled.

There is also known a motor vehicle equipped with (c) automatic cruising control means for automatically controlling the amount of opening of the throttle valve so that the vehicle runs at a substantially constant speed. Various methods have been proposed for effecting the automatic cruising control. According to one proposed method, the actual vehicle speed is compared with upper and lower limits which are determined depending upon a desired vehicle speed (hereinafter referred to as "auto-cruising speed" when appropriate) preset by a vehicle operator, and the opening of the throttle valve is reduced by a predetermined amount when the actual vehicle speed rises above the upper limit, and is increased by a predetermined amount when the actual vehicle speed falls below the lower limit. According to an alternative method, the amount of opening of the throttle valve is controlled in a feedback manner, depending upon the amount of an error or difference between the actual vehicle speed and the preset auto-cruising speed.

In some cases where the vehicle is running on a downhill having a relatively low gradient, the overall running resistance of the vehicle may be zero, and the vehicle speed can be maintained substantially constant with the throttle valve kept in the engine idling position. The overall running resistance includes an air resistance, a rolling resistance and a hill climbing resistance (negative value in the case of a downhill). If the automatic cruising control is effected in such condition, the throttle valve is placed in an alternate idling and non-idling state wherein the amount of opening of the throttle valve is alternately increased and reduced in a small degree near the engine idling position. Namely, the alternate idling and non-idling state is a state in which the throttle valve is alternately placed in the engine idling position and a position near the engine idling position, at a relatively high frequency. If the vehicle is equipped with the fuel cutting means and the clutch control means, the fuel supply to the engine is cut and the lock-up clutch is controlled with the throttle valve placed in the engine idling position, whereby the vehicle is subject to a larger engine braking effect than in the case where the fuel cut and the lock-up clutch control are not effected. This results in a higher rate of reduction of the vehicle speed. When the vehicle speed is reduced below the lower limit of the automatic cruising control, the amount of opening of the throttle valve is increased, and the fuel cut is terminated, whereby the vehicle speed is raised. The higher rate of reduction of the vehicle speed indicated above leads to hunting or periodic variation of the vehicle speed at a relatively high frequency, and a periodic variation of the drive torque at the same frequency due to alternate fuel cut and supply of the engine by the fuel cutting means. These hunting and variation are unexpected and undesirable to the vehicle operator. Where the lock-up clutch is controlled in the slip control mode in such condition, in particular, the fuel cut tends to be effected even at a relatively low vehicle speed, and the problem of hunting or variation of the vehicle speed and drive torque is accordingly aggravated.

The above problem is likely to occur during the automatic cruising control. However, a similar problem may occur when the vehicle operator manipulates the accelerator pedal so as to maintain the vehicle speed at a substantially constant level, since this manipulation has substantially the same effect as the automatic cruising control by the automatic cruising control means. The relatively high hunting frequency of the vehicle speed indicative above means a relatively high frequency at which the operating amount of the accelerator pedal should be increased and decreased by the vehicle operator. Since the engine braking force and the drive torque vary at a high frequency due to alternate idling and non-idling of the engine, the manipulation of the accelerator pedal so as to hold the vehicle speed substantially constant is difficult. The throttle valve may be placed in the alternate idling and non-idling state even when the accelerator pedal is manipulated by the vehicle operator so as to accelerate or decelerate the vehicle. In this case, too, the driving comfort of the vehicle as felt by the vehicle operator is deteriorated due to a relatively high frequency of hunting of the vehicle speed and drive torque, and the manipulation of the accelerator pedal tends to be difficult.

SUMMARY OF THE INVENTION

It is therefore an object of the present invention to provide an apparatus for controlling a motor vehicle equipped with the fuel cutting means and clutch control means indicated above, which apparatus assures significantly reduced hunting or variation frequencies of the vehicle speed and drive torque for improved driving comfort and drivability of the vehicle, when the throttle valve is placed in the alternate idling and non-idling state as in automatic cruising control in which the amount of opening of the throttle valve is automatically controlled by the automatic cruising control means as indicated above.

The above object may be achieved according to one aspect of the present invention, which provides an apparatus for controlling a motor vehicle having an engine, a throttle valve for controlling an intake air quantity of the engine, a fluid-filled power transmitting device connected to the engine, and a lock-up clutch disposed in parallel with the power transmitting device, the throttle valve having an engine idling position for idling of the engine, the apparatus comprising: (a) fuel cutting means for cutting a fuel supply to the engine while the throttle valve is placed in the engine idling position; (b) clutch control means for effecting at least partial engagement of the lock-up clutch while the throttle valve is placed in the engine idling position; (c) automatic cruising control means for automatically controlling an amount of opening of the throttle valve so that a running speed of the vehicle is substantially constant; and (d) clutch engagement restricting means for restricting engagement of the lock-up clutch by the clutch control means, while the throttle valve is controlled by the automatic cruising control means.

In the motor vehicle control apparatus constructed according to the first aspect of this invention described above, partial or full engagement of the lock-up clutch by the clutch control means is restricted or inhibited by the clutch engagement restricting means while the throttle valve is controlled by the automatic cruising control means. Described more specifically, the throttle valve may be placed in the engine idling position during the automatic cruising control, and the clutch control means would effect partial engagement (slip control) or full engagement of the lock-up clutch if the clutch engagement restricting means were not provided. In the present control apparatus, however, the partial or full engagement of the lock-up clutch by the clutch control means is at least restricted by the clutch engagement restricting means. For example, the clutch control means is inhibited from operating to start the engagement of the lock-up clutch, or alternatively, the operation of the clutch control means is terminated if a predetermined condition or conditions is/are satisfied, for instance, if the frequency at which the throttle valve is placed in the engine idling position and a position near the engine idling position or the frequency at which the fuel cutting means is turned on and off is higher than a predetermined threshold. In either case, the lock-up clutch is eventually fully released when the clutch engagement restricting means is activated.

According to the present control apparatus, the engagement of the lock-up clutch by the clutch control means is restricted even where the fuel cutting means is alternately turned on and off for alternate fuel cut and supply of the engine during running of the vehicle on a downhill having a relatively low gradient, with the overall running resistance of the vehicle being almost zero, while the automatic cruising control means is in operation. Since the lock-up clutch is held in its fully released state in such condition, a decrease in the engine output due to the fuel cut when the throttle valve is in the engine idling position will not cause a large engine braking effect, since a torque is not transmitted from the vehicle drive wheels to the engine through the lock-up clutch, but is transmitted through only the fluid-filled power transmitting device. With the relatively small engine braking effect, the vehicle speed is lowered at a relatively low rate, and the frequencies of variation or hunting of the vehicle speed and drive torque due to the alternate fuel cut and supply are made relatively low, whereby the driving comfort of the vehicle is improved.

Since the engagement of the lock-up clutch by the clutch control means is restricted or inhibited by the clutch engagement restricting means during the automatic cruising control, the lowest vehicle speed at which the fuel cut control is effected is raised as indicated in FIG. 10B. This means that the range of the vehicle speed within which the fuel cut is effected is narrowed when the engagement of the lock-up clutch is restricted by the clutch engagement restricting means during the automatic cruising control. Accordingly, the possibility of the alternate fuel cut and supply during the automatic cruising control is reduced, whereby the driving comfort of the vehicle is further improved. At the vehicle speed lower than the lower limit of the fuel cut speed range, the fuel cut is not effected even when the throttle valve is in the engine idling position, whereby the engine braking effect is further reduced, and the hunting or variation frequency of the vehicle speed is further lowered. Consequently, the torque variation due to the alternate fuel cut and supply is eliminated and the driving comfort is further improved.

In the present vehicle control apparatus, the clutch engagement restricting means is adapted to restrict the engagement of the lock-up clutch by the clutch control means during the automatic cruising control by the automatic cruising control means. According to this arrangement, the engine braking force can be kept relatively small even if the fuel cut and supply are alternately repeated as a result of adjustment of the opening of the throttle valve by the automatic cruising control means while the throttle valve is almost fully closed. Therefore, the frequency of variation of the vehicle speed and the frequency of variation of the drive torque due to the alternate fuel cut and supply are significantly lowered, and the driving comfort of the vehicle is accordingly improved. Further, since the fuel-cut range of the vehicle speed is narrowed, the possibility of the automatic cruising control which involves the alternate fuel cut and supply is reduced. Moreover, the fuel cut is not effected at the vehicle speed lower than the lower limit of the fuel cut range, even when the throttle valve is placed in the engine idling position, whereby the engine braking force is further reduced, with a result of further lowering the variation frequency of the vehicle speed and eliminating the variation of the drive torque due to the alternate fuel cut and supply, leading to a further improvement in the driving comfort of the vehicle.

The object indicated above may also be achieved according to a second aspect of this invention, which provides an apparatus for controlling a motor vehicle having an engine, a throttle valve for controlling an intake air quantity of the engine, a fluid-filled power transmitting device connected to the engine, and a lock-up clutch disposed in parallel with the power transmitting device, the throttle valve having an engine idling position for idling of the engine, the apparatus comprising: (i) fuel cutting means for cutting a fuel supply to the engine while the throttle valve is placed in the engine idling position; (ii) clutch control means for effecting at least partial engagement of the lock-up clutch while the throttle valve is placed in the engine idling position; (iii) idling monitoring means for determining whether the throttle valve is placed in an alternate idling and non-idling state in which a frequency at which the throttle valve is alternately placed in the engine idling position and a position near the engine idling position is higher than a predetermined threshold; and (iv) clutch engagement restricting means for restricting engagement of the lock-up clutch by the clutch control means, if the idling monitoring means determines that the throttle valve is placed in the alternate idling and non-idling state.

In the motor vehicle control apparatus according to the second aspect of the present invention described above, the idling monitoring means determines whether the throttle valve is placed in the alternate idling and non-idling state, and the clutch engagement restricting means restricts the engagement of the lock-up clutch by the clutch control means if the idling monitoring means determines that the throttle valve is placed in the alternate idling and non-idling state. Thus, the clutch engagement restricting means is activated to inhibit or terminate the engagement of the lock-up clutch, irrespective of whether the throttle valve is controlled by the automatic cruising control means, as long as the throttle valve is placed in the alternate idling and non-idling state, so that the clutch engagement restricting means prevents undesirable variation or hunting of the vehicle speed and drive torque at high frequencies. The clutch engagement restricting means is activated also while the automatic cruising control means is in operation, since the throttle valve is placed in the alternate idling and non-idling state during the automatic cruising control.

The present apparatus according to the second aspect of this invention is effective also when the vehicle operator manipulates the accelerator pedal so as to run the vehicle at a substantially constant speed, as well as when the automatic cruising control means is in operation to control the throttle valve to hold the vehicle speed substantially constant. Further, the present apparatus which is effective to lower the frequency of variation of the vehicle speed makes it possible to lower the frequency at which the amount of operation of the accelerator pedal should be alternately increased and decreased, and also makes it possible to reduce the engine braking effect and the amplitude of the drive torque variation. Thus, the present apparatus permits easier manipulation of the accelerator pedal for constant running of the vehicle. The instant apparatus is also effective to lower the frequencies of variation or hunting of the vehicle speed and drive torque due to alternate idling and non-idling of the throttle valve even when the vehicle is in acceleration or deceleration. Accordingly, the driving comfort and drivability of the vehicle are significantly improved during acceleration and deceleration of the vehicle as well as during constant running in the automatic cruising mode or with the operator's manipulation of the accelerator pedal.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 2 is a table indicating a relationship between the operating positions of an automatic transmission provided in the power transmitting system of FIG. 1 and the respective combinations of the operating states of clutches and brakes of the automatic transmission;

FIG. 9 is a view indicating boundaries defining different control areas of the lock-up clutch in relation to the running condition of the vehicle, which boundaries are stored in the slip control apparatus shown in FIG. 3;

DETAILED DESCRIPTION OF THE PREFERRED EMBODIMENTS

Figure 1:
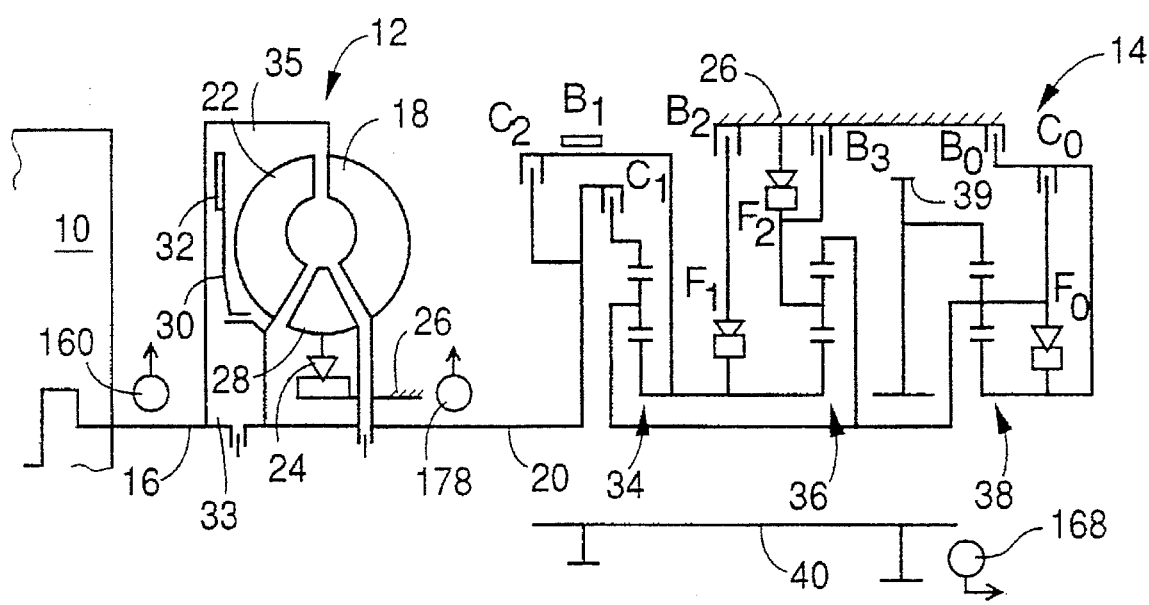
FIG. 1 a schematic view illustrating an engine and a power transmitting system of a motor vehicle, which are controlled by a control apparatus constructed according to one embodiment of this invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st" "2nd" "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
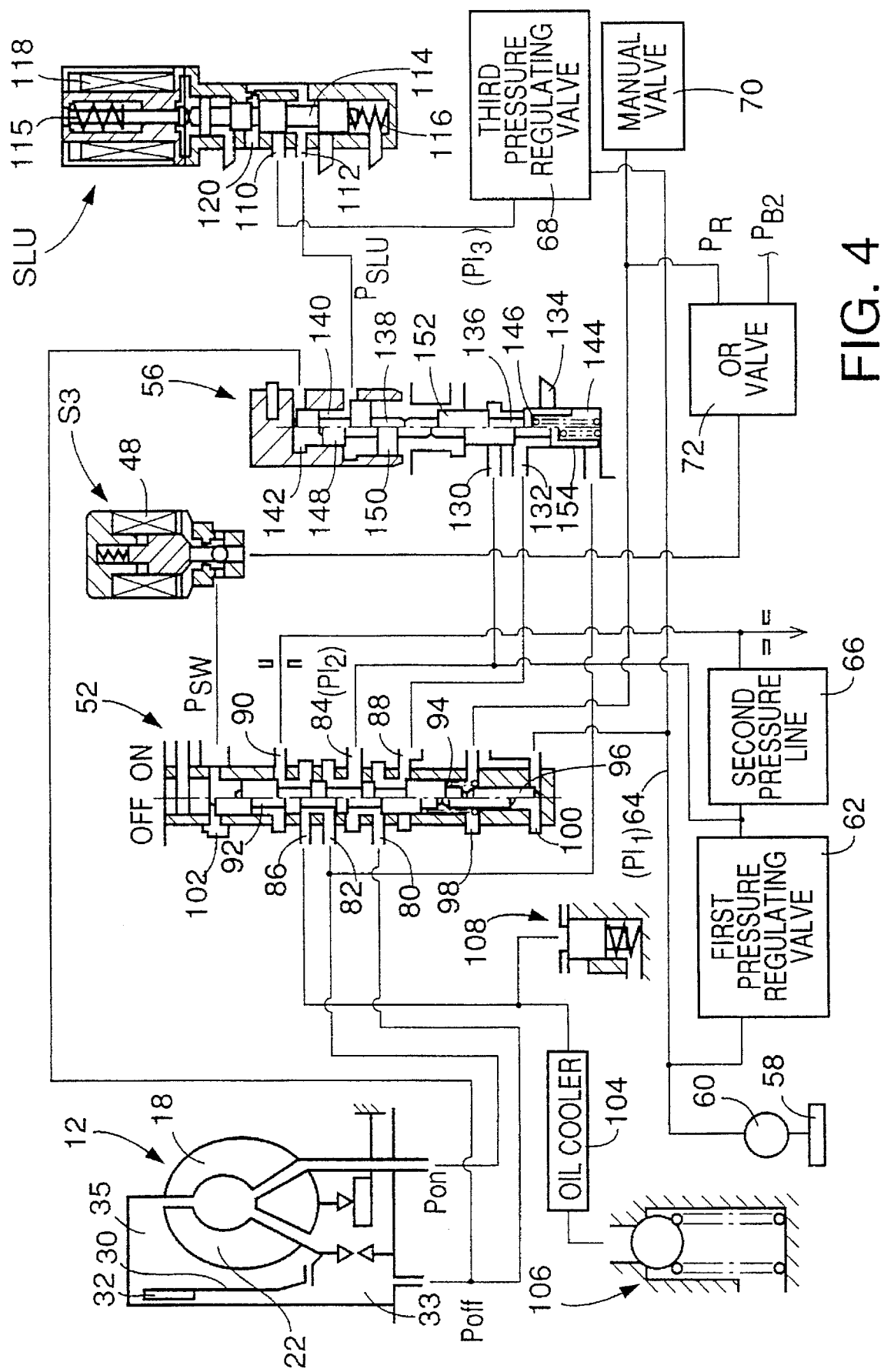
FIG. 4 is a view illustrating a part of a hydraulic control device shown in FIG. 3, which incorporates a circuit for controlling the lock-up clutch.
Figure 5:
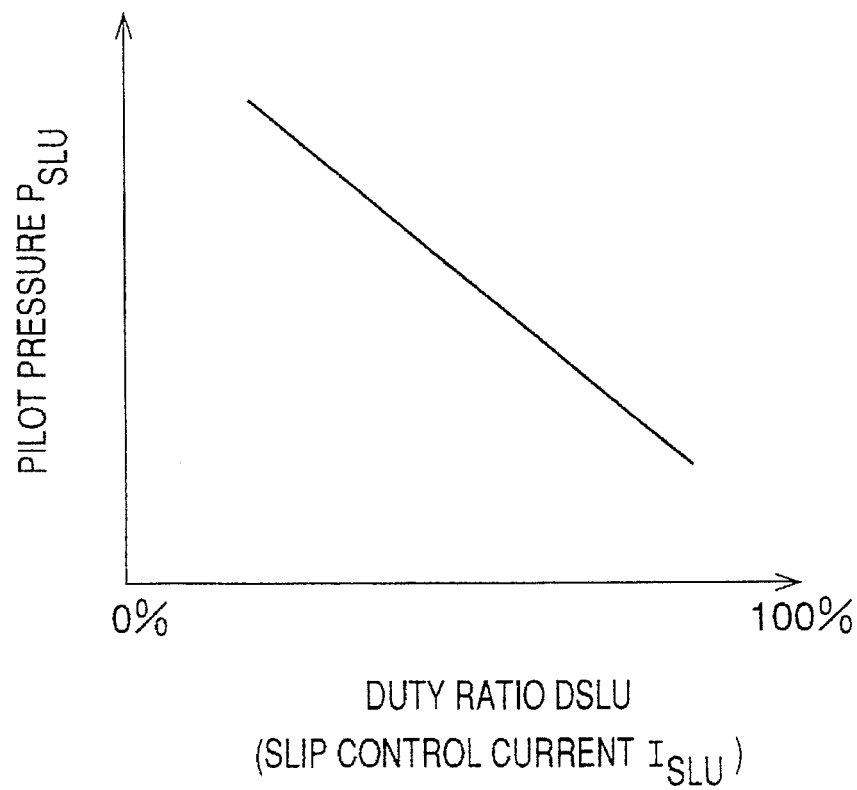
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve closing direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2−A1)/A1 included in the following equation (1):

$$\Delta P = Pon - Poff = [(A2-A1)/A1]P_{SLU} - Fs/A1 \qquad (1)$$

where, Fs: biasing force of the spring 146.

Figure 6:
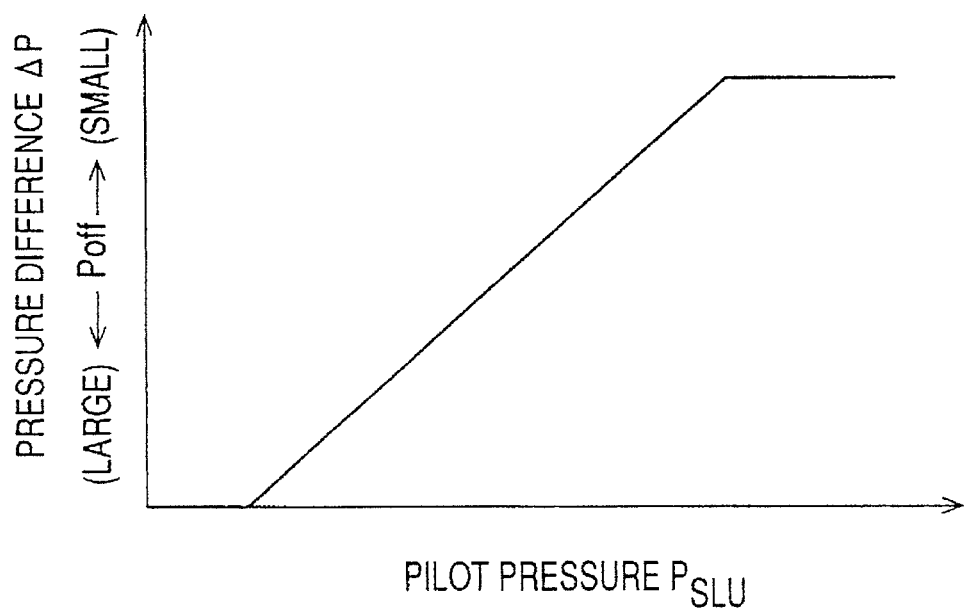
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ results in a decrease in the pressure difference ΔP and causes an increase in the slip speed $N_{SLP}$. The slip speed $N_{SLP}$ is a difference $(N_P - N_T)$ between a speed $N_P$ of the pump impeller 18 (speed $N_E$ of the engine 10) and a speed $N_T$ of the turbine impeller 22 (speed Nin of the input shaft 20).

Figure 3:
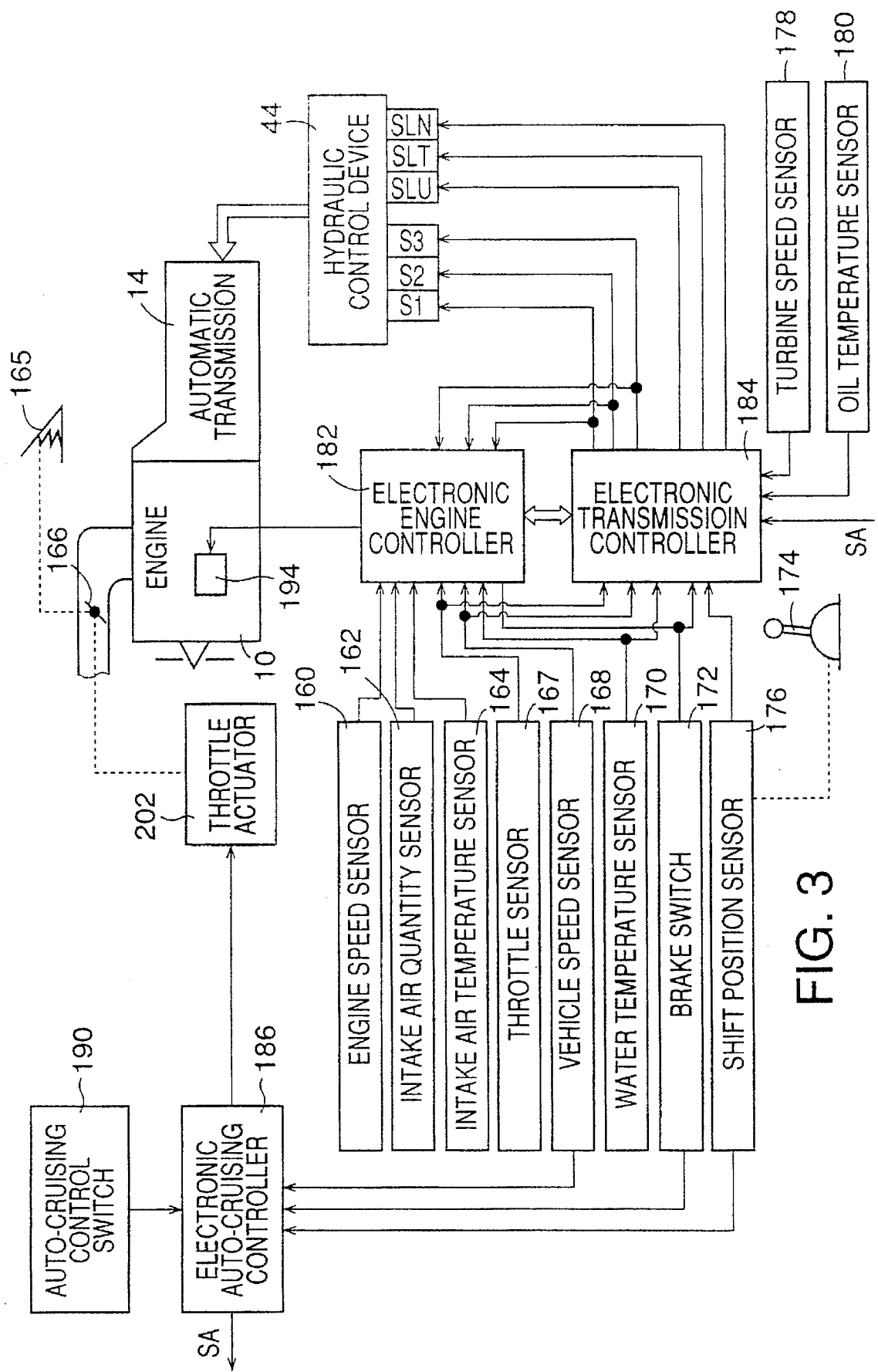
FIG. 3 is a block diagram showing a control system for the motor vehicle, which includes the control apparatus for the engine, automatic transmission and a lock-up clutch.
Figure 7:
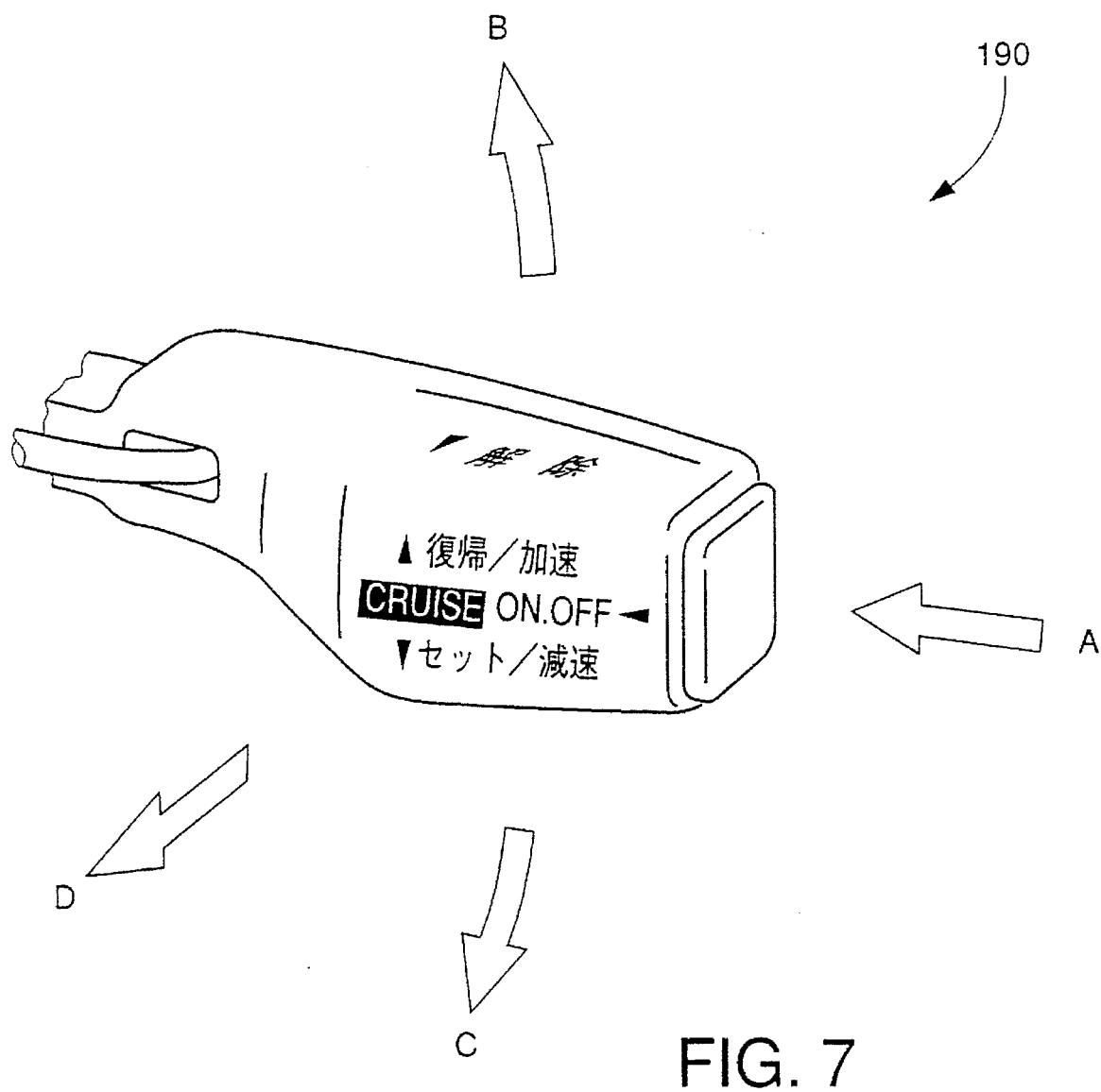
FIG. 7 is a perspective view showing an example of an auto-cruising control switch provided on the vehicle.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening θ of the throttle valve 166 operated by an accelerator pedal 165; a vehicle speed sensor 168 for detecting a running speed V of the vehicle on the basis of a speed Nout of the output shaft 40 of the automatic transmission 14; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 14, namely, a currently selected one of the operating positions "L" "S" "D" "N" "R" and "P" of the shift lever 174; a turbine speed sensor 178 for detecting the speed $N_T$ of the turbine impeller 22, that is, the speed Nin of the input shaft 20 of the transmission 14; and an oil temperature sensor 180 for detecting a temperature $T_{OIL}$ of the working oil in the hydraulic control device 44. The throttle sensor 167 is equipped with an idling position switch for detecting the idling position of the throttle valve 166. The idling position is near the fully closed position. The idling position switch generates an IDLING signal which is ON when the throttle valve 166 is in the idling position. The vehicle also has an auto-cruising control switch 190 disposed near the steering wheel. The auto-cruising control switch 190 is operated as indicated at A through D in FIG. 7, to initiate and terminate the automatic cruising control, and set and change an auto-cruising speed $V_{AUTO}$ as needed.

The output signals generated by the above sensors and switches are applied directly or indirectly to electronic engine controller 182, electronic transmission controller 184 and electronic auto-cruising controller 186. The engine and transmission controllers 182, 184 are connected to each other by a communication interface, for applying the necessary signals to each other. Each of the controllers 182, 184, 186 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the engine 10, automatic transmission 14 and lock-up clutch 32. The controllers 182, 184, 186 incorporate functional means as indicated in the block diagram of FIG. 8, namely, fuel cutting means 192, clutch control means 196, clutch engagement restricting means 198 and automatic cruising control means 200.

The fuel cutting means 192, which is provided by the engine controller 182, is adapted to cut a fuel supply to the engine 10 for the purpose of improving the fuel economy and prevent overheating of the catalyst used for the engine, while the IDLING signal generated by the idling position switch of the throttle sensor 167 is ON, that is, while the vehicle is in coasting deceleration with the throttle valve 166 placed in the idling position. Described in detail, the fuel cutting means 192 closes a fuel injection valve 194 (FIG. 3) of the engine 10 to cut the fuel supply to the engine 10 if the engine speed $N_E$ is higher than a predetermined fuel-cut threshold $N_{ON}$ while the IDLING signal is ON. When the engine speed $N_E$ falls below a predetermined fuel-supply threshold $N_{OFF}$, the fuel cutting means 192 opens the fuel injection valve 194 to resume the fuel supply to the engine 10. The fuel-cut and fuel-supply threshold speeds $N_{ON}$ and $N_{OFF}$ may be appropriately determined fixed values, or may vary depending upon a suitable parameter such as the coolant water temperature $T_{WA}$. While only the engine speed $N_E$ is used in the present embodiment to initiate and terminate the fuel cut of the engine 10, other parameters as well as the engine speed $N_E$ may be used as the conditions to initiate and terminate the fuel cut.

The fuel cut control by the fuel cutting means 192 may be effected in other situations as well as while the throttle valve 166 is placed in the engine idling position. For instance, the fuel supply to the engine 10 may be cut to protect the engine when the engine speed $N_E$ exceeds a predetermined upper limit. The engine controller 182 is assigned to perform other control operations of the engine 10 depending upon the intake air quantity Q, throttle valve opening θ, engine speed $N_E$, intake air temperature $T_{AIR}$ and coolant water temperature $T_{WA}$. These other control operations include operations to control the amount and time of injection of the air-fuel mixture through the fuel injection valve 194, the time of ignition by an ignitor, idling speed of the engine 10 by an idling speed adjusting device, and opening and closing timings of the intake and exhaust valves of the engine 10 by a variable valve timing mechanism, according to predetermined data maps or arithmetic formulas or algorithms, so as to maintain the required output of the engine 10 and maximize the fuel economy while minimizing the amounts of toxic exhaust emissions.

The automatic cruising control means 200, which is provided by the auto-cruising controller 186, is adapted to control a throttle actuator 202 (FIG. 3) for controlling the amount of opening θ of the throttle valve 166 so that the vehicle runs at the preset auto-cruising speed $V_{AUTO}$. The throttle actuator 202 includes an electric motor operated to change the amount of opening θ of the throttle valve 166. Explained more specifically by reference to FIGS. 12A–C, the automatic cruising control means 200 compares the detected actual vehicle speed V with upper and lower limits $V_{MAX}$ and $V_{MIN}$ which are determined by the preset auto-cruising speed $V_{AUTO}$, and controls the throttle actuator 202 so as to reduce the opening θ of the throttle valve 166 by a predetermined amount when the actual vehicle speed V rises above the upper limit $V_{MAX}$, and increase the opening θ by a predetermined amount when the actual vehicle speed V falls below the lower limit $V_{MIN}$. However, the automatic cruising control means 200 may be adapted to control the throttle actuator 202 otherwise, for instance, in a feedback fashion for changing the throttle valve opening θ depending upon the difference between the actual vehicle speed V and the auto-cruising speed $V_{AUTO}$. The automatic cruising control is manually cancelled or reset by an appropriate operation of the auto-cruising control switch 190, or automatically cancelled when one of the other predetermined conditions is satisfied, for example, when the brake pedal is depressed or when the shift lever 174 is operated to the NEUTRAL position N.

The transmission controller 184, which incorporates the clutch control means 196 and the clutch engagement restricting means 198, is adapted to control the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening θ and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

The lock-up clutch 32 is controlled by the transmission controller 184 when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 9 are stored in the ROM. For instance, the boundaries are relationships between the throttle valve opening θ and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening θ and output speed Nout, one of the three control areas is determined or selected by the CPU of the transmission controller 184, according to the boundaries stored in the ROM.

Figure 10A:
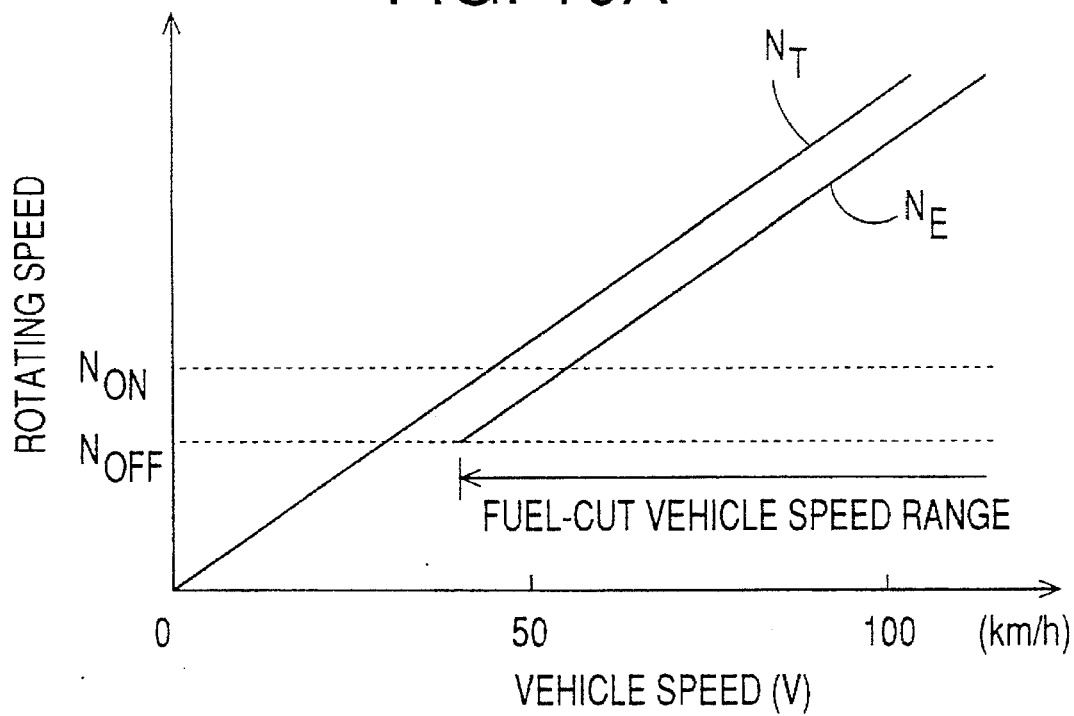
FIGS. 10A and 10B are graphs indicating relationships among turbine impeller speed $N_T$, engine speed $N_E$ and vehicle speed V when a throttle valve is placed in its engine idling position, the graph of FIG. 10A indicating the relationship where the lock-up clutch is controlled in a slip control mode, while the graph of FIG. 10B indicating the relationship where the lock-up clutch is held in its fully released position.

When the vehicle running condition (θ and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 9 stored in the ROM is effected while the vehicle is accelerating. The amount of slip of the lock-up clutch 32 is also controlled while the vehicle is coasting or decelerating with the throttle valve 166 placed in the idling position. This slip control is effected to increase the range of the vehicle speed V within which the fuel cut control of the engine 10 is effected by the fuel cutting means 192. That is, if the lock-up clutch 32 is controlled in the slip control mode by the clutch control means 196 to control the amount of slip during the fuel cut control, the engine speed $N_E$ is changed in parallel with the turbine impeller speed $N_T$ even when the vehicle speed V is relatively low, as indicated in FIG. 10A. As a result, the vehicle speed V when the engine speed $N_E$ has been lowered to the fuel-supply threshold $N_{OFF}$ is lower where the lock-up clutch 32 is controlled in the slip control mode by the clutch control means 196 as in the case of FIG. 10A, than in the case of FIG. 10B in which the lock-up clutch 32 is not controlled in the slip control mode. Accordingly, the fuel cut is effected over a wider range of the vehicle speed V when the lock-up clutch is controlled, than when the lock-up clutch is not controlled. Thus, the clutch control means 196 is activated during the fuel cut control by the fuel cutting means 192. However, the clutch engagement restricting means 198 inhibits the clutch control means 196 from operating during the automatic cruising control by the automatic cruising control means 200. That is, the lock-up clutch 32 is held in the fully released state with the clutch control means 196 being disabled while the automatic cruising control means 200 is operating.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, that is, the duty ratio $D_{SLU}$ of the valve SLU is adjusted according to the following equation (2) to control the amount of slip of the lock-up clutch 32 in a slip control mode:

$$D_{SLU} (=I_{SLU})=DFWD+KGD+DFB \quad (2)$$

For instance, the duty ratio $D_{SLU}$ (%) (=SLIP CONTROL current $I_{SLU}$) is calculated to zero an error $\Delta E$ (=$N_{SLP}$−$TN_{SLP}$) between a target slip speed $TN_{SLP}$ and the actual slip speed $N_{SLP}$ (=$N_E$−$N_T$) of the lock-up clutch 32. The first term DFWD of the right member of the above equation (2) is the feed forward control value which corresponds to the output of the engine 10 such as the output torque. The second term KGD is a learning control value which changes so as to reflect the varying characteristics of the lock-up clutch 32. The third term DFB is a feedback control value which is a sum of a proportional value, a differential value and an integral value of the error $\Delta E$, as indicated in the following equation (3):

$$DFB=K_P[\Delta E+(1/TI)\int\Delta Edt+T_D(d\Delta E/dt)] \quad (3)$$

Referring next to the flow chart of FIG. 11, there will be described a routine executed by the clutch control means 196 and the clutch engagement restricting means 198 of the transmission controller 184. The routine of FIG. 11, which is executed at a predetermined cycle time, is initiated with step S1 to determine whether the idling position switch of the throttle sensor 167 is ON (whether the IDLING signal generated by the switch is ON), that is, whether the throttle valve 166 is placed in the engine idling position. If a negative decision (NO) is obtained in step S1, namely, if the throttle valve 166 is not placed in the engine idling position, it means that the fuel cutting means 192 is not in operation, and the control flow goes to step S7 in which the clutch engagement restricting means 198 inhibits the slip control (partial engagement) of the lock-up clutch 32 by the clutch control means 196 and hold the clutch 32 in the fully released state.

If an affirmative decision (YES) is obtained in step S1, the control flow goes to step S2 to determine whether the throttle actuator 202 is currently controlled by the automatic cruising control means 200, namely, whether the automatic cruising control means 200 is in operation. This determination may be made, for example, depending upon whether a signal SA indicative of the operation of the automatic cruising control means 200 is generated by the auto-cruising controller 186. If an affirmative decision (YES) is obtained in step S2, the above-indicated step S7 is implemented, and the clutch engagement restricting means 198 is activated to inhibit the slip control of the lock-up clutch 32 by the clutch control means 196 during deceleration of the vehicle. If a negative decision (NO) is obtained in step S2, the control flow goes to step S3 to determine whether the lock-up clutch 32 is currently controlled in the slip control mode by the clutch control means 196 during deceleration of the vehicle. This determination may be made on the basis of the SLIP CONTROL current $I_{SLU}$ being applied to the linear solenoid valve SLU. If a negative decision (NO) is obtained in step S3, the control flow goes to step S4 to determine whether the conditions for initiating the slip control of the lock-up clutch 32 are satisfied. These slip control initiating conditions may include: a condition that the slip speed $N_{SLP}$=$N_E$−$N_T$ is higher than a predetermined threshold (e.g., −50 r.p.m.); and a condition that the temperature $T_{OIL}$ of the working fluid or the turbine impeller speed $N_T$ is held within a predetermined range. If an affirmative decision (YES) is obtained in step S4, step S5 is implemented to initiate the slip control of the lock-up clutch 32 during deceleration of the vehicle with the throttle valve 166 placed in the engine idling position. If a negative decision (NO) is obtained in step S4, the control flow goes to the above-indicated step S7 to inhibit the slip control of the lock-up clutch 32 and hold the clutch 32 in its fully released state.

If an affirmative decision (YES) is obtained in step S3, that is, if the lock-up clutch 32 is being controlled in the slip control mode by the clutch control means 196, the control flow goes to step S6 to determine whether the conditions for terminating the slip control of the lock-up clutch 32 are satisfied. The slip control terminating conditions may include: a condition that the slip speed $N_{SLP}$=$N_E$−$N_T$ is lower than a predetermined threshold (e.g., −100 r.p.m.); and a condition that the temperature $T_{OIL}$ or the turbine impeller speed $N_T$ is held within a predetermined range. If an affirmative decision (YES) is obtained in step S6, the control flow goes to step S7 to terminate the slip control of the lock-up clutch 32 during deceleration of the vehicle. If a negative decision (NO) is obtained in step S6, step S5 is implemented to continue the slip control of the lock-up clutch 32.

It will be understood that a portion of the transmission controller 184 assigned to implement steps S1 and S3–S7 constitutes the clutch control means 196, while a portion of the transmission controller 184 assigned to implement steps S2 and S7 constitutes the clutch engagement restricting means 198.

In the present vehicle control apparatus described above, the affirmative decision (YES) is obtained in step S2 while the throttle actuator 202 is controlled by the automatic cruising control means 200. In this case, step S7 is implemented so that the clutch engagement restricting means 198 inhibits the clutch control means 196 from controlling the amount of slip of the lock-up clutch 32. According to the present arrangement, the lock-up clutch 32 is held in its fully released state even where the amount of opening of the throttle valve 166 is adjusted by the automatic cruising control means 200 with intermittent activation of the fuel cutting means 192 to effect alternate fuel cut and supply of the engine 10, while the overall running resistance of the vehicle is substantially zero as in a vehicle run on a downhill having a relatively small gradient. In this arrangement, a decrease in the output of the engine 10 due to the fuel cut with the throttle valve 166 placed in the engine idling position will not cause a large engine braking effect, since the negative torque is not transmitted from the vehicle drive wheels to the engine 10 through the lock-up clutch 32, that is, transmitted through only the torque converter 12. Consequently, the present arrangement assures slow reduction of the vehicle speed V, and permits significant reduction in the frequencies of the variation or hunting of the vehicle speed and the transmission torque due to the alternate fuel cut and supply of the engine 10, thereby permitting improved driving comfort of the vehicle as felt by the vehicle operator.

Figure 10B:
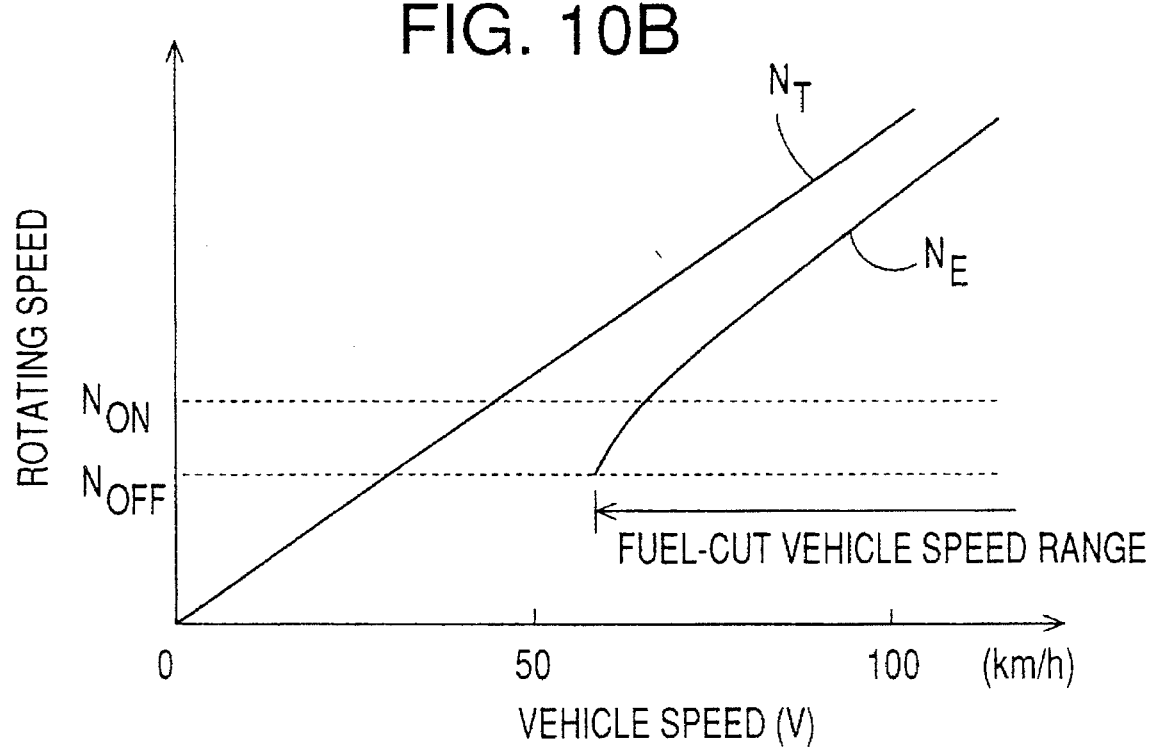

As described above, the lowest vehicle speed V at which the fuel cut control is effected is raised as indicated in FIG. 10B if the slip control of the lock-up clutch 32 is not effected. This means that the range of the vehicle speed within which the fuel cut is effected is narrowed if the lock-up clutch 32 is not controlled in the slip control mode during the automatic cruising control. Accordingly, the possibility of alternate fuel cut and supply during the automatic cruising control is reduced, whereby the driving comfort of the vehicle is further improved. At the vehicle speed V lower than the lower limit of the fuel cut speed range, the fuel cut is not effected even when the throttle valve 166 is in the engine idling position, whereby the engine braking effect is further reduced, and the hunting or variation frequency of the vehicle speed V is further lowered. Consequently, the torque variation due to the alternate fuel cut and supply is eliminated and the driving comfort is further improved.

The time charts of FIGS. 12A, 12B and 12C indicate changes of the vehicle speed V where the throttle valve 166 is controlled by the automatic cruising control means 200 such that the throttle valve 166 is alternately placed in its engine idling position and a position near the engine idling position. In the cases of FIGS. 12A and 12B, the slip control (partial engagement) of the lock-up clutch 32 by the clutch control means 196 is inhibited by the clutch engagement restricting means 198 during the automatic cruising control by the automatic cruising control means 200, according to the principle of the present invention. In the case of FIG. 12A, the fuel cut by the fuel cutting means 192 is effected when the vehicle speed V is in the fuel-cut range while the throttle valve 166 is in the engine idling position or while the idling position switch is ON. In the case of FIG. 12B, the fuel cut is not effected when the vehicle speed V is not in the fuel-cut range, irrespective of whether the throttle valve 166 is in the engine idling position or not. In the case of FIG. 12C, the slip control of the lock-up clutch 32 is effected by the clutch control means 196 even during the automatic cruising control by the automatic cruising control means 200, as in the prior art. In the case of FIG. 12C, the fuel cut and the slip control of the lock-up clutch 32 will cause a relatively large engine brake to be applied to the vehicle when the throttle valve 166 is in the engine idling position, so that the vehicle speed V is lowered at a relatively high rate, and the vehicle speed V and the transmission torque suffer from variation or hunting at relatively high frequencies.

In the present vehicle control apparatus, the clutch engagement restricting means 198 is adapted to inhibit the slip control of the lock-up clutch 32 by the clutch control means 196 during the automatic cruising control by the automatic cruising control means 200. According to this arrangement, the engine braking force can be kept relatively small even if the fuel cut and supply are alternately repeated as a result of adjustment of the opening θ of the throttle valve 166 by the automatic cruising control means 200 while the throttle valve 166 is almost fully closed. Therefore, the frequency of variation of the vehicle speed V and the frequency of variation of the drive torque due to the alternate fuel cut and supply are significantly lowered, and the driving comfort of the vehicle is accordingly improved. Further, since the fuel-cut range of the vehicle speed is narrowed, the possibility of the automatic cruising control which involves the alternate fuel cut and supply is reduced. Moreover, the fuel cut is not effected at the vehicle speed V lower than the lower limit of the fuel cut range, even when the throttle valve 166 is placed in the engine idling position, whereby the engine braking effect is further reduced, with a result of further lowering the variation frequency of the vehicle speed V and eliminating the variation of the drive torque due to the alternate fuel cut and supply, leading to a further improvement in the driving comfort of the vehicle.

Figure 13:
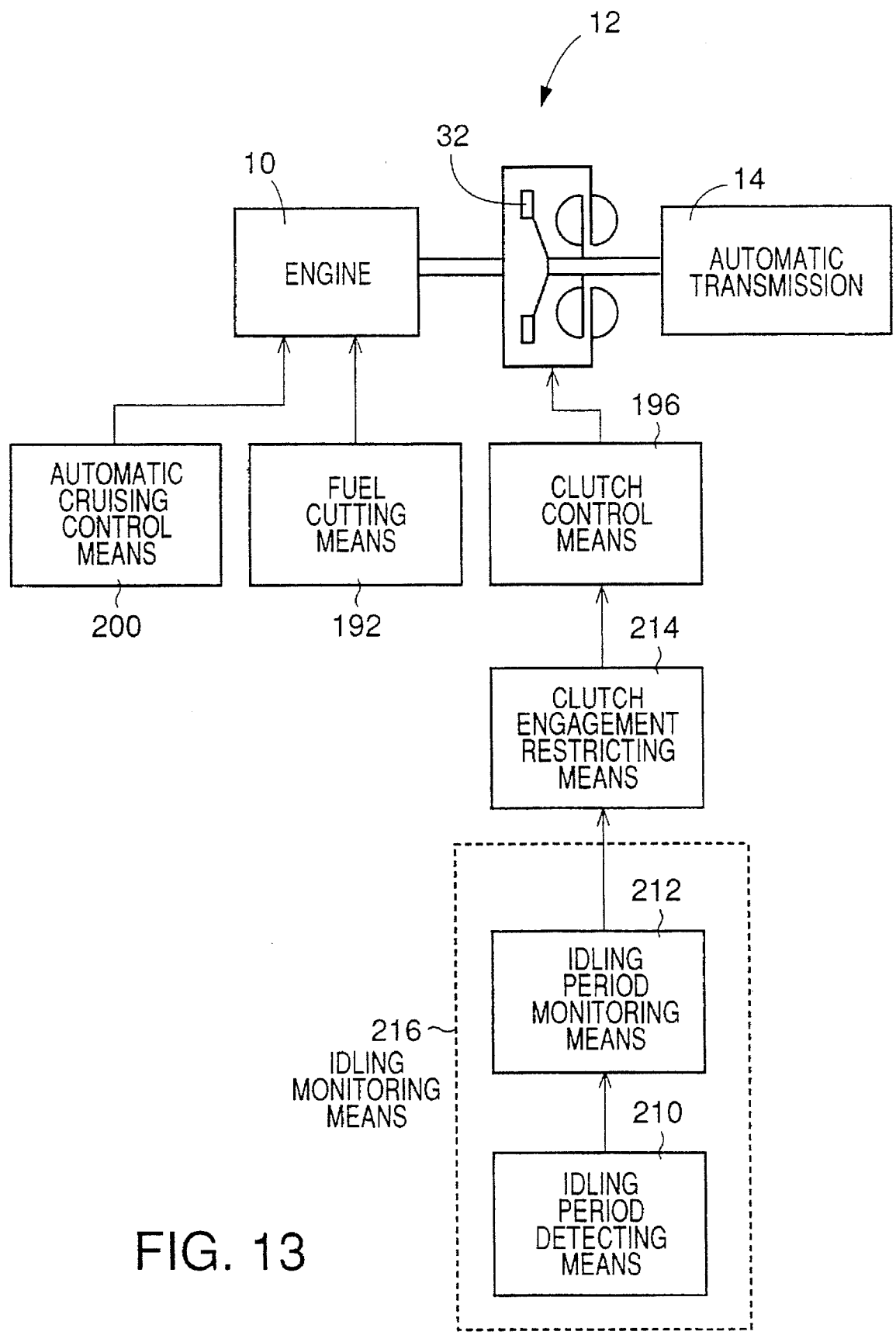
FIG. 13 is a block diagram corresponding to that of FIG. 8, showing another embodiment of this invention.
Figure 14:
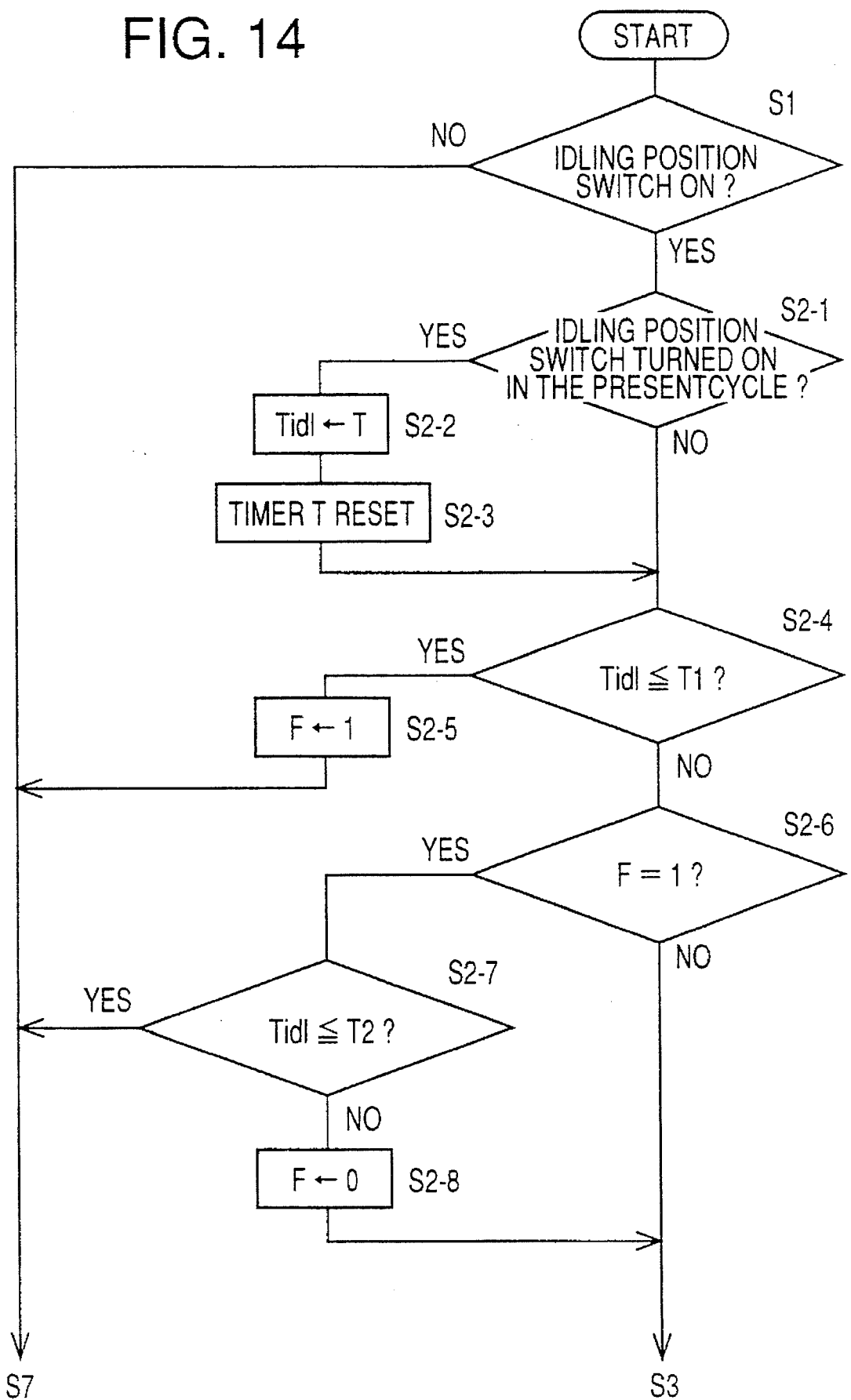
FIG. 14 is a flow chart illustrating a routine executed by idling period detecting means and idling period monitoring means provided in the embodiment of FIG. 13.

Referring next to FIGS. 13 and 14, there will be described another embodiment of the present invention, which is substantially identical in hardware construction with the first embodiment of FIGS. 1–8. However, the present second embodiment does not use the signal SA generated by the auto-cruising controller 186. Unlike the control apparatus according to the first embodiment illustrated in the block diagram of FIG. 8, the control apparatus according to the present embodiment illustrated in the block diagram of FIG. 13 includes idling monitoring means 216 connected to clutch engagement restricting means 214. The idling monitoring means 216 incorporates idling period detecting means 210 and idling period monitoring means 212. The clutch engagement restricting means 214 and the idling monitoring means 216 as well as the clutch control means 196 are provided by the transmission controller 184.

The idling period detecting means 210 is adapted to detect an idling ON-OFF period $T_{idl}$ as indicated in FIG. 12A, namely, a period $T_{idl}$ of a waveform of the IDLING signal generated by the idling position switch of the throttle sensor 167. That is, the idling ON-OFF period $T_{idl}$ is a time duration between two successive moments at which the IDLING signal is turned ON and between which the IDLING signal is turned OFF. The detection of the idling ON-OFF period $T_{idl}$ is effected on the basis of the ON and OFF states of the IDLING signal. The idling period monitoring means 212 is adapted to determine, on the basis of the detected idling ON-OFF period $T_{idl}$, whether the throttle valve 166 is placed in an alternate idling and non-idling state, that is, in a state in which the frequency at which the throttle valve 166 is alternately placed in the engine idling position and a position relatively near the engine idling position is higher than a predetermined threshold. The clutch engagement restricting means 214 is adapted to inhibit the clutch control means 196 from operating to control the amount of slip of the lock-up clutch 32 if the idling period monitoring means 212 determines that the throttle valve 166 is placed in the alternate idling and non-idling state.

The flow chart of FIG. 14 illustrates a part of a routine executed by the clutch control means 196, idling period detecting means 210, idling period monitoring means 212 and clutch engagement restricting means 214. Steps S1 and S2-1 through S2-8 shown in FIG. 14 correspond to steps S1 and S2 of FIG. 11. Step S3 of FIG. 11 is implemented if a negative decision (NO) is obtained in step S2-6 or after step S2-8 is implemented. Step S7 of FIG. 11 is implemented if a negative decision (NO) is obtained in step S1 as in the first embodiment, or if an affirmative decision (YES) is obtained in step S2-7 or after step S2-5 is implemented.

If the affirmative decision (YES) is obtained in step S1, namely, if the IDLING signal is currently ON, step S2-1 is implemented to determine whether the IDLING signal has been turned ON in step S1 in this cycle of execution of the routine of FIG. 14. If an affirmative decision (YES) is obtained in step S2-1, the control flow goes to step S2-2 in which the content of a timer T is stored as the idling ON-OFF period $T_{idl}$, and to step S2-3 in which the timer T is reset and re-started. Thus, the timer T is adapted to measure a time duration between each pair of two adjacent successive moments at which the IDLING signal is turned ON. This time duration consists of a time during which the IDLING signal is held ON and the following time during which the IDLING signal is held OFF. As mentioned above, the idling ON-OFF period $T_{idl}$ is the period of the waveform of the IDLING signal. The timer T may be adapted to measure a time by counting the number of clock signals generated by a crystal oscillator provided in the transmission controller 184.

Step S2-3 is followed by step S2-4 to determine whether the idling ON-OFF period $T_{idl}$ is equal to or shorter than a predetermined first reference T1, that is, whether the throttle valve 166 is placed in the alternate idling and non-idling state. If an affirmative decision (YES) is obtained in step S2-4, step S2-5 is implemented to set an IDLING ON-OFF flag F to "1". Step S2-5 is followed by step S7 of FIG. 11 in which the slip control of the lock-up clutch 32 by the clutch control means 196 is inhibited by the clutch engagement restricting means 214. The first reference T1 is determined so that when the fuel cut control of the fuel injection valve 194 and the slip control of the lock-up clutch 32 are both effected, the frequencies of variation or hunting of the vehicle speed V and drive torque due to alternate fuel cut and supply with the throttle valve 166 placed in the alternate idling and non-idling state are low enough to prevent an appreciable driving discomfort as felt by the vehicle operator. The first reference T1 may be a fixed value, or may vary depending upon a suitable parameter such as the vehicle speed V.

If a negative decision (NO) is obtained in step S2-4, that is, if the idling ON-OFF period $T_{idl}$ is longer than the predetermined first reference T1, the control flow goes to step S2-6 to determine whether the IDLING ON-OFF flag F is set at "1". If a negative decision (NO) is obtained in step S2-6, that is, if the negative decision (NO) is obtained in step S2-6 without the flag F previously set to "1", step S3 of FIG. 11 is implemented. If the flag F is set at "1", an affirmative decision (YES) is obtained in step S2-6, and the control flow goes to step S2-7 to determine whether the idling ON-OFF period $T_{idl}$ is equal to or shorter than a predetermined second reference T2, that is, whether the throttle valve 166 is placed in the alternate idling and non-idling state. This second reference T2 is determined to be slightly longer than the first reference T1 indicated above, with the characteristics of the engine 10 and the vehicle taken into account. The reference T2 may be a fixed value or may vary depending upon a suitable parameter such as the vehicle speed V.

If the idling ON-OFF period $T_{idl}$ is equal to or shorter than the second reference T2, step S7 is implemented to inhibit the slip control of the lock-up clutch 32, because the slip control of the lock-up clutch 32 will cause the idling ON-OFF period $T_{idl}$ to be equal to or shorter than the first reference T1. If the period $T_{idl}$ is longer than the second reference T2, the control flow goes to step S2-8 to reset the flag F to "0", and then goes to step S3, because the slip control of the lock-up clutch 32 will not cause the idling ON-OFF period $T_{idl}$ to become shorter than the first reference T1 and will not deteriorate the driving comfort of the vehicle.

It will be understood from the above description that a portion of the transmission controller 184 assigned to implement steps S2-1, S2-2 and S2-3 constitutes the idling period detecting means 210 for detecting the idling ON-OFF period $T_{idl}$, while a portion of the transmission controller 184 assigned to implement steps S2-4 through S2-8 constitutes the idling period monitoring means 212 for determining whether the throttle valve 166 is placed in the alternate idling and non-idling state. It will also be understood that a portion of the transmission controller 184 assigned to implement step S7 which is implemented when the affirmative decision is obtained in step S2-4 or S2-7 constitutes the clutch engagement restricting means 214 for inhibiting the clutch control means 196 from operating to control the lock-up clutch 32 in the slip control mode.

In the present second embodiment, the detected idling ON-OFF period $T_{idl}$ is compared with the predetermined first and second references T1, T2, to determine whether the throttle valve 166 is placed in the alternate idling and non-idling state. If it is determined that the throttle valve 166 is placed in the alternate idling and non-idling state, the slip control of the lock-up clutch 32 is inhibited or terminated. In other words, the clutch engagement restricting means 214 is activated to inhibit or terminate the slip control of the lock-up clutch 32, irrespective of whether the throttle actuator 202 is controlled by the automatic cruising control means 200, as long as the IDLING signal is alternately turned ON and OFF at a relatively high frequency, in order to prevent undesirable variation or hunting of the vehicle speed V and the drive torque at high frequencies. The clutch engagement restricting means 214 is activated also while the automatic cruising control means 200 is in operation, since the idling ON-OFF period $T_{idl}$ is shorter than the reference T1, T2 during the automatic cruising control.

The present second embodiment is effective when the vehicle operator manipulates the accelerator pedal so as to run the vehicle at a substantially constant speed, as well as when the automatic cruising control means 200 is in operation to control the throttle actuator 202. Further, the present embodiment which is effective to lower the frequency of variation of the vehicle speed makes it possible to lower the frequency at which the amount of operation of the accelerator pedal should be increased and decreased, and also makes it possible to reduce the engine braking effect and the amplitude of the drive torque variation. Thus, the present second embodiment permits easier manipulation of the accelerator pedal for constant running of the vehicle. The instant embodiment is also effective to lower the frequencies of variation or hunting of the vehicle speed and drive torque due to alternate idling and non-idling of the engine even when the vehicle is in acceleration or deceleration. Accordingly, the driving comfort and drivability of the vehicle are significantly improved during acceleration and deceleration of the vehicle as well as during constant running in the automatic cruising mode or with the operator's manipulation of the accelerator pedal.

While the present invention has been described above in detail in its presently preferred embodiments by reference to the accompanying drawings, it is to be understood that the invention is not limited to the details of the illustrated embodiments, but may be embodied otherwise.

In the illustrated embodiments, the clutch control means 196 is adapted to control the lock-up clutch 32 in the slip control mode so as to control the amount of slip of the clutch 32 while the throttle valve 166 is placed in the engine idling position. However, the clutch control means 196 may be adapted to fully engage the lock-up clutch 32 while the throttle valve 166 is placed in the engine idling position.

Figure 8:
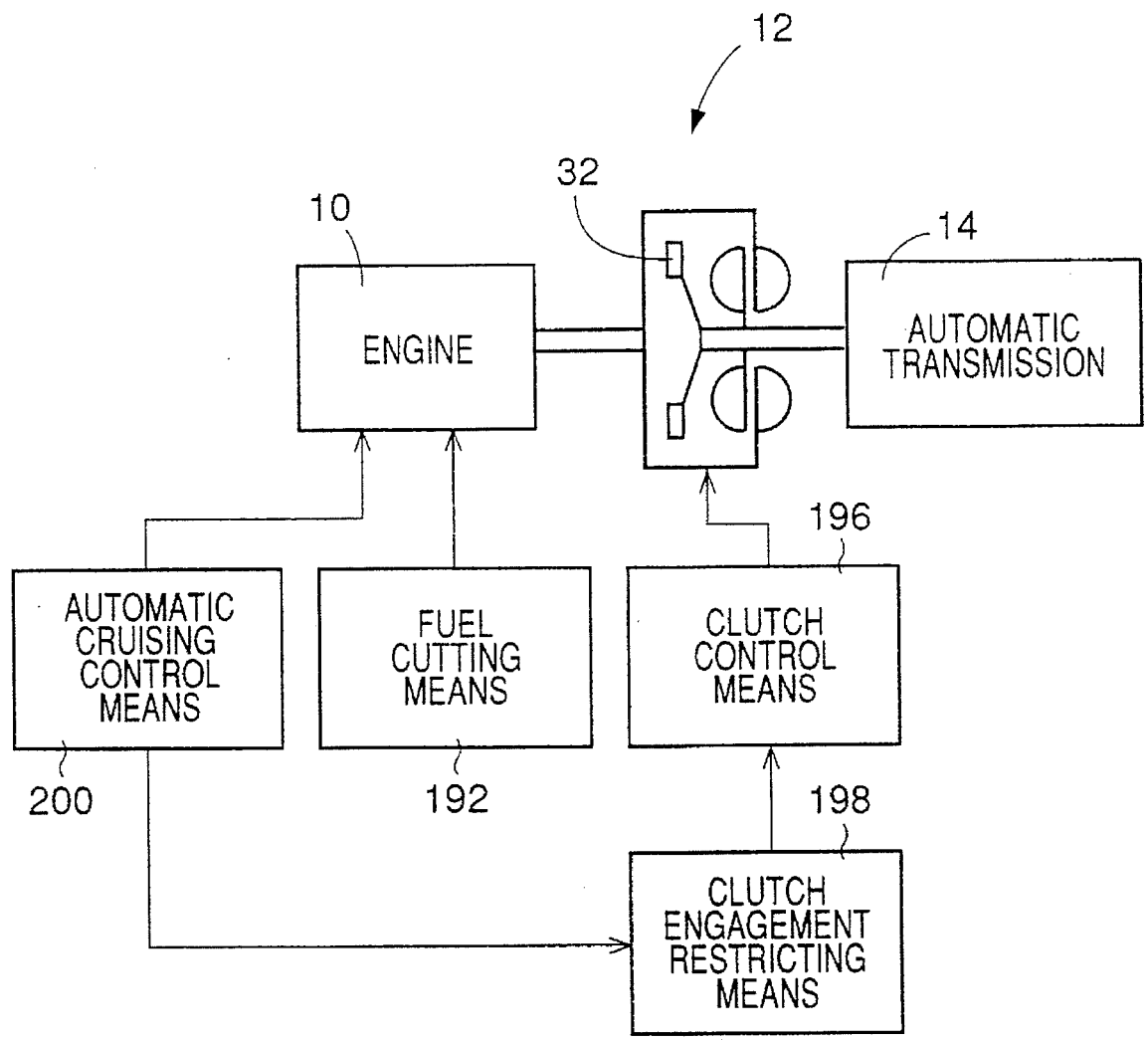
FIG. 8 is a block diagram illustrating the functional means incorporated in the control apparatus.
Figure 11:
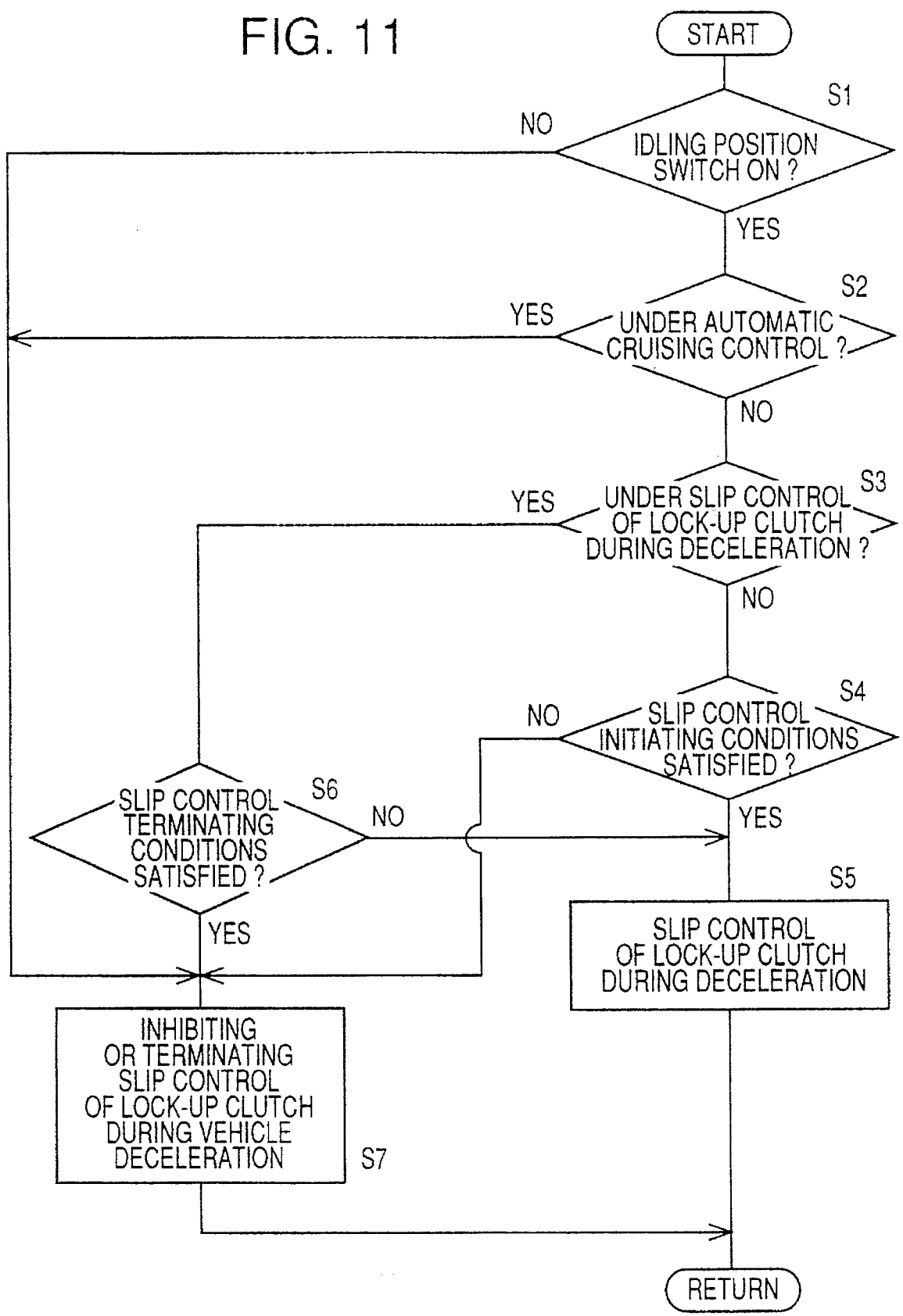
FIG. 11 is a flow chart illustrating a routine executed by clutch control means and clutch engagement restricting means of the control apparatus.

In the first embodiment of FIGS. 8 and 11, the slip control or partial engagement of the lock-up clutch 32 is inhibited or terminated under any condition as long as the automatic cruising control means 200 is in operation to control the throttle actuator 202, the partial or full engagement of the lock-up clutch 32 may be permitted if a predetermined condition or conditions of the vehicle is/are satisfied, even when the automatic cruising control means 200 is in operation. That is, the partial or full engagement of the lock-up clutch 32 does not matter if the hunting of the vehicle speed V or drive torque is not so serious. Therefore, the clutch engagement restricting means 198 may be adapted to restrict the partial or full engagement of the lock-up clutch 32 only if the hunting period of the vehicle speed V or drive torque or the idling ON-OFF period as used in the second embodiment of FIGS. 13 and 14 is shorter than a predetermined threshold while the automatic cruising control means 200 is in operation. Other vehicle running conditions may be used by the clutch engagement restricting means 198 to restrict the engagement of the lock-up clutch 32. For instance, the engagement of the lock-up clutch 32 may be restricted only if the vehicle speed V is lower than a predetermined threshold while the automatic cruising control means 200 is in operation.

Similar modifications may be made in the second embodiment. For example, the vehicle speed V or any other parameter or parameters other than the idling ON-OFF period $T_{idl}$ may be used by the clutch engagement restricting means 214, so that the engagement of the lock-up clutch 32 is restricted, inhibited or permitted if predetermined conditions associated with such parameters are all satisfied. Although the second embodiment is arranged such that the slip control or partial engagement of the lock-up clutch 32 is inhibited or terminated if the idling ON-OFF period $T_{idl}$ is equal to or shorter than the second reference T2, the engagement of the lock-up clutch 32 may be permitted or resumed if a predetermined condition or conditions is/are satisfied even where the period $T_{idl}$ is equal to or shorter than the second reference T2. For instance, the engagement of the lock-up clutch 32 may be resumed if a predetermined time has passed or if the vehicle acceleration or throttle valve opening θ has exceeded a predetermined limit, irrespective of the idling ON-OFF period $T_{idl}$.

In the illustrated embodiments, the throttle valve 166 is mechanically controlled by the accelerator pedal 165 unless the automatic cruising control means 200 is in operation. However, the principle of the present invention is equally applicable to a vehicle wherein the throttle valve 166 is controlled by the throttle actuator 202 in response to an operation of the accelerator pedal 165 such that the amount of opening θ of the throttle valve 166 varies with the detected amount of operation of the accelerator pedal 165.

In the illustrated embodiments, the electronic auto-cruising controller 186 which provides the automatic cruising control means 200 is independent of the electronic engine and transmission controllers 182, 184. However, the engine controller 182 and/or the transmission controller 184 may also function as the automatic cruising control means 200. Further, the controllers 182, 184, 186 may be replaced by a single control device which has the functions of the controllers 182, 184, 186.

The automatic cruising control by the automatic cruising control means 200 may be suitably related to the shift control of the automatic transmission 14. For example, where the vehicle speed V is raised even with the throttle valve 166 placed in the engine idling position, as in a vehicle run on a downhill, the automatic transmission 14 is automatically shifted down, and the amount of opening θ of the throttle valve 166 is suitably controlled.

Figure 12:
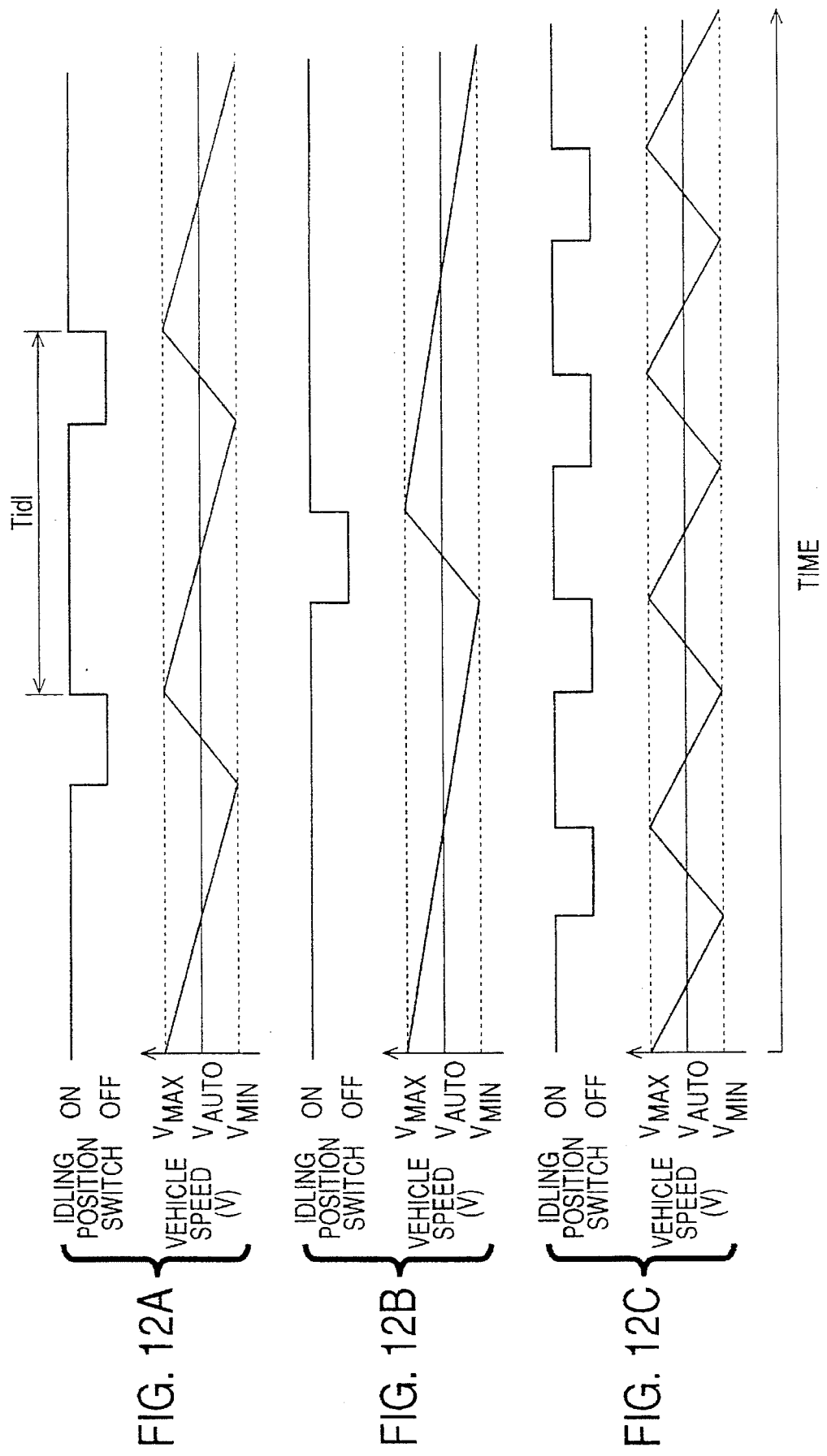
FIGS. 12A, 12B and 12C are time charts indicating changes in the vehicle speed V and the state of an idling position switch during automatic cruising control of the engine, FIGS. 12A, 12B and 12C respectively corresponding to a case where the slip control of the lock-up clutch is not effected but the fuel cut is effected while the idling position switch is ON, a case where the fuel cut and the slip control of the lock-up clutch are not effected, and a case where the fuel cut and the slip control of the lock-up clutch are both effected.

Although the vehicle control apparatus according to the second embodiment of FIGS. 12 and 14 is provided with the auto-cruising controller 186 (automatic cruising control means 200), the principle of the second embodiment is equally applicable to a control apparatus which does not have the automatic cruising control function.

While the second embodiment uses the idling ON-OFF period $T_{idl}$ of the throttle valve 166 to determine whether the throttle valve 166 is placed in the alternate idling and non-idling state, this alternate idling and non-idling state may be determined on the basis of other parameters, for example, by checking if the ON-OFF period or frequency of the fuel cutting means 192 or clutch control means 196 is shorter or higher than a predetermined threshold.

Although the idling ON-OFF period $T_{idl}$ used in the second embodiment is a time duration between two successive moments at which the IDLING signal generated by the idling position switch of the throttle sensor 167 is turned ON, this period $T_{idl}$ may be a time duration between two successive moments at which the IDLING signal is turned OFF. Further, the period $T_{idl}$ may be an average (e.g., moving average) of two or more periods which have been detected in respective cycles of execution of the routine of FIG. 14.

The routine of FIG. 11 or 14 may be replaced by a modified routine adapted to inhibit or terminate the engagement of the lock-up clutch 32 if the automatic cruising control means 200 is in operation, or if the throttle valve 166 is placed in the alternate idling and non-idling state. This modified routine is obtained by inserting steps S2-1 through S2-8 of FIG. 14 between steps S2 and S3 of FIG. 11.

It is to be understood that the present invention may be embodied with various other changes, modifications and improvements, which may occur to those skilled in the art, without departing from the spirit and scope of the invention defined in the following claims:

What is claimed is:

1. An apparatus for controlling a motor vehicle having an engine, a throttle valve for controlling an intake air quantity of the engine, a fluid-filled power transmitting device connected to the engine, and a lock-up clutch disposed in parallel with the power transmitting device, said throttle valve having an engine idling position for idling of the engine, said apparatus comprising:

fuel cutting means for cutting a fuel supply to said engine while said throttle valve is placed in said engine idling position;

clutch control means for effecting at least partial engagement of said lock-up clutch while said throttle valve is placed in said engine idling position;

automatic cruising control means for automatically controlling an amount of opening of said throttle valve so that a running speed of the vehicle is substantially constant; and clutch engagement restricting means for restricting engagement of said lock-up clutch by said clutch control means, while said throttle valve is controlled by said automatic cruising control means.

2. An apparatus according to claim 1, further comprising cruising control monitoring means for determining whether said automatic cruising control means is in operation to control the amount of opening of said throttle valve.

3. An apparatus according to 1, wherein said clutch control means controls an amount of slip of said lock-up clutch while said throttle valve is placed in said engine idling position, and said clutch engagement restricting means inhibits said clutch control means from operating to control the amount of slip of said lock-up clutch while said throttle valve is controlled by said automatic cruising control means.

4. An apparatus according to claim 1, further comprising throttle valve monitoring means for determining whether said throttle valve is placed in said engine idling position.

5. An apparatus according to claim 4, wherein said throttle valve monitoring means comprises an idling position switch which generates an idling signal when said throttle valve is placed in said engine idling position, said throttle valve monitoring means determines, on the basis of said idling signal, whether said throttle valve is placed in said engine idling position.

6. An apparatus for controlling a motor vehicle having an engine, a throttle valve for controlling an intake air quantity of the engine, a fluid-filled power transmitting device connected to the engine, and a lock-up clutch disposed in parallel with the power transmitting device, said throttle valve having an engine idling position for idling of the engine, said apparatus comprising:

fuel cutting means for cutting a fuel supply to said engine while said throttle valve is placed in said engine idling position;

clutch control means for effecting at least partial engagement of said lock-up clutch while said throttle valve is placed in said engine idling position;

idling monitoring means for determining whether said throttle valve is placed in an alternate idling and non-idling state in which a frequency at which said throttle valve is alternately placed in said engine idling position and a position near said engine idling position is higher than a predetermined threshold; and clutch engagement restricting means for restricting engagement of said lock-up clutch by said clutch control means, if said idling monitoring means determines that said throttle valve is placed in said alternate idling and non-idling state.

7. An apparatus according to claim 6, wherein said idling monitoring means comprises detecting means for detecting said frequency at which said throttle valve is alternately placed in said engine idling position and said position near said engine idling position.

8. An apparatus according to claim 7, wherein said detecting means consists of an idling period detecting means for detecting a period between successive moments at which said throttle valve is placed in said engine idling position or said position near said engine idling position, and determining said frequency on the basis of said period.

9. An apparatus according to claim 8, wherein said idling monitoring means further comprises idling monitoring means for determining whether said period is shorter than a predetermined reference, and determining whether said throttle valve is placed in said alternate idling and non-idling state, depending upon whether said period is shorter than said predetermined reference.

10. An apparatus according to 6, wherein said clutch control means controls an amount of slip of said lock-up clutch while said throttle valve is placed in said engine idling position, and said clutch engagement restricting means inhibits said clutch control means from operating to control the amount of slip of said lock-up clutch while said throttle valve is controlled by said automatic cruising control means.

11. An apparatus according to claim 6, further comprising throttle valve monitoring means for determining whether said throttle valve is placed in said engine idling position.

12. An apparatus according to claim 11, wherein said throttle valve monitoring means comprises an idling position switch which generates an idling signal when said throttle valve is placed in said engine idling position, said throttle valve monitoring means determines, on the basis of said idling signal, whether said throttle valve is placed in said engine idling position.

13. An apparatus according to claim 6, further comprising automatic cruising control means for automatically controlling an amount of opening of said throttle valve so that a running speed of the vehicle is substantially constant, said clutch engagement restricting means restricting the engagement of said lock-up clutch by said clutch control means, if said throttle valve is placed in said alternate idling and non-idling state or controlled by said automatic cruising control means.

\* \* \* \* \*